Patented June 9, 1931

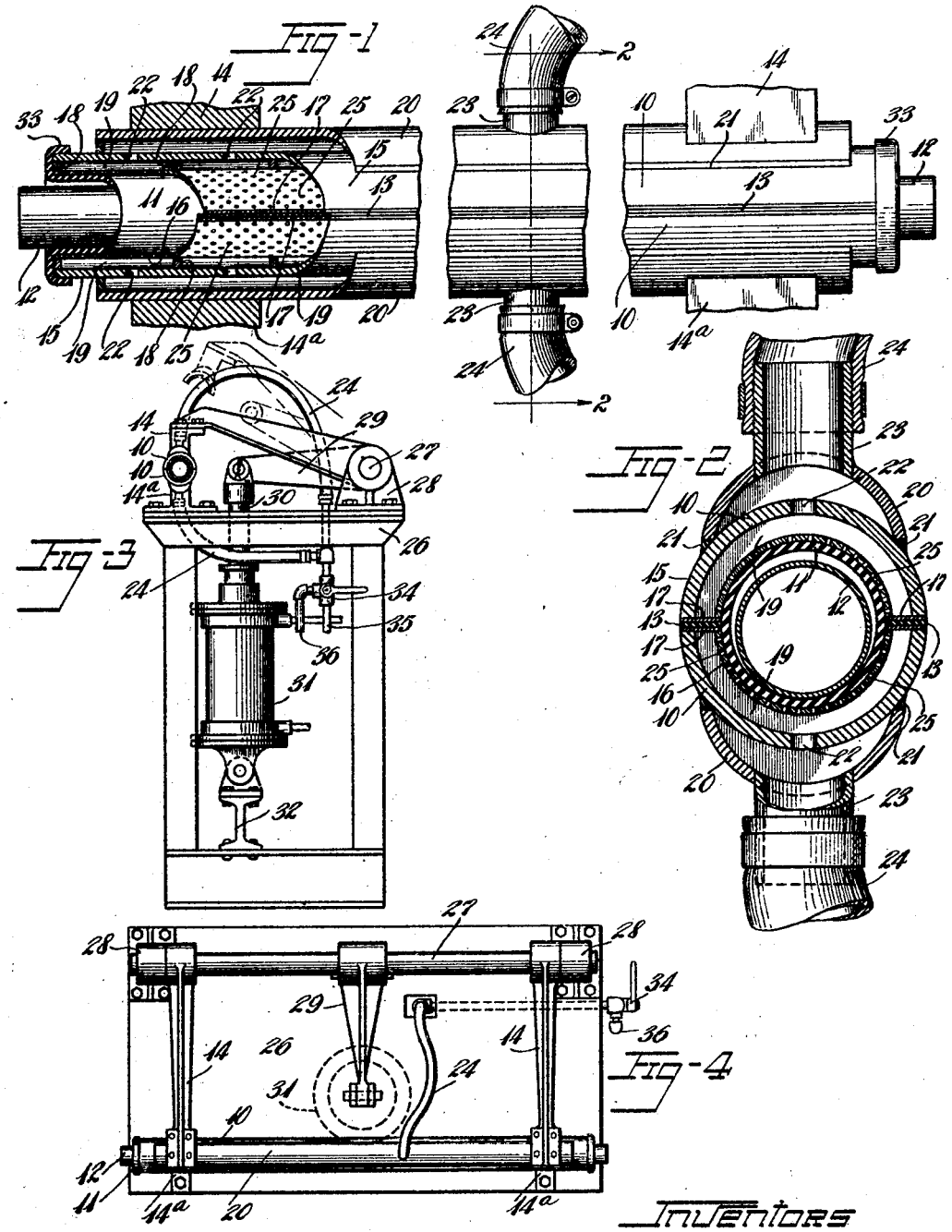

1,809,260

UNITED STATES PATENT OFFICE

GEORGE F. WILSON, OF AKRON, AND WILLIAM H. SLABAUGH, OF CUYAHOGA FALLS, OHIO, ASSIGNORS TO THE B. F. GOODRICH COMPANY, OF NEW YORK, N. Y., A CORPORATION OF NEW YORK

STRIPPING DEVICE AND METHOD

Application filed December 18, 1928. Serial No. 326,820.

This invention relates to the removal of rubber articles from the forms or mandrels upon which they are manufactured, and particularly to the removal of rubber articles manufactured directly from latex, from the forms while they are still moist.

Rubber deposits produced from latex or other similar rubber dispersions, either by dipping, suction, electrodeposition, or any other convenient method, have a more or less spongy structure, and contain a considerable proportion of water, which must be removed by drying the deposit. The water content is normally so high, varying from 30% to 60% or even more, that the deposits require a drying time of hours or even days. It becomes desirable then, to remove the deposits from the mandrels on which they are made, before they have been dried, in order that the mandrels may be reemployed immediately, and in order to prevent excessive corrosion of the mandrels, when these are made of metal. However, the very water content which renders desirable the removal of the wet deposit from the mandrel, also makes the deposit very soft and readily damaged.

Heretofore, it has been the general practice to remove such articles as rubber tubes from the mandrels upon which they are manufactured, either by starting at one end and turning the rubber back upon itself in such a manner that the tube is turned inside out in the process of removal, or by blowing a current of air between the tube and the mandrel in such a manner as to distend the tube sufficiently to enable it to be withdrawn from the mandrel.

The first of these processes inevitably entails a considerable distortion of the rubber deposit, which frequently results in a permanent marking or damage to the rubber. The second of the above processes requires the employment of air under considerable pressure in order that the rubber tube be distended over its entire length, the rapid current of air, passing between the tube and the mandrel and escaping at the end of the tube, acting as a cushion during the withdrawal. However, if the tube adheres to the mandrel, even if only slightly, the air entrapped in the anterior portion of the tube unduly distends and may even burst the soft rubber deposit.

The object of this invention, therefore, is to provide a method and apparatus, whereby such tubes or similar soft and readily damaged rubber articles may be removed from the mandrels or forms substantially without distorting or stretching the rubber. A further object is to provide a means for compressing and compacting wet rubber deposits, a substantial proportion of the water content being squeezed out of the deposit. Further objects will appear in the following description of the invention.

This invention, in brief, consists in removing a wet rubber deposit, produced from rubber latex or a similar aqueous dispersion, from the mandrel or form on which it is produced, by applying suction thereto. The wet deposit is drawn by the suction against a foraminous supporting surface, the atmospheric pressure on the other side of the deposit pressing it firmly against the surface and squeezing a large part of the water out of the deposit. The reduction in water content increases the firmness of the deposit and renders it less liable to damage during any subsequent handling. This process therefore removes the soft, tender, wet rubber deposits from the mandrels without injuring them, and at the same time reduces their water content sufficiently to lend them a firmer consistency and to reduce the time required for drying them.

The apparatus by means of which this process is carried out should preferably be adapted for easy insertion of the coated mandrel and easy withdrawal of the mandrel after the removal of the coating by suction as hereinabove described. It should also be so constructed that the edges of the deposit may readily be brought in contact therewith, to prevent loss of the vacuum due to leakage. An embodiment of such an apparatus, which has proven particularly useful in the removal of wet latex tubes from cylindrical mandrels is illustrated in the accompanying drawings.

Fig. 1 is a side view of one embodiment of the apparatus of this invention, parts being sectioned and broken away.

Fig. 2 is a section on a larger scale through the line 2, 2 in Fig. 1.

Fig. 3 is an end view on a reduced scale of the apparatus of Fig. 1, mounted in the operating position.

Fig. 4 is a plan view of the mounted apparatus shown in Fig. 3.

Referring to Fig. 1, the body of the apparatus is seen to consist of two symmetrical halves 10, 10, somewhat shorter than the length of the rubber tube 11 which is shown already distended away from the mandrel 12. The two halves of the body 10, 10 are held in place by pressure exerted through the supporting arms 14, 14, air-tight longitudinal gaskets 13, 13 serving to seal the joint.

Each half of the apparatus consists of a hemicylindrical outer metal shell 15 connected to a similar concentric inner shell 16 by longitudinal flanges 17, 17 and annular partitions 18, 18, which reenforce the structure and divide the space between the two shells into numerous compartments 19, 19. The joints between these parts may conveniently be brazed or welded, but should be made absolutely air-tight. The outer shell 15, in turn is surmounted by a manifold 20 which may readily be constructed of a hemicylindrical shell of somewhat smaller diameter than the outer shell 15, and attached thereto, as by brazing or welding, at 21. Each compartment 19 is connected to the manifold 20 by an aperture 22 of sufficient size to allow free passage of air from one to the other. The manifolds 20, 20, in turn, are connected by short tubes 23, 23 and lengths of hose 24, 24 to a three-way valve 34, shown in Fig. 3 and Fig. 4. By means of the valve communication may be established between the compartments 19, 19 and either a vacuum line 35 or a compressed air line 36. The inner shell 16 in Fig. 1 is pierced by numerous small holes 25, 25 evenly spaced over the entire surface of the shell. The inside diameter of the inner shell 16 is sufficiently large to allow the easy withdrawal of the mandrel 12 after the rubber tube 11 has been distended against the shell in the position shown in Figs. 1 and 2.

The two halves of the apparatus are shown in juxtaposition in Fig. 2. The direct connection of the compartment 19, between the inner shell 16 and outer shell 15, through the aperture 22 with the manifold 20 and the vacuum hose 24 is clearly evident.

The halves of the apparatus 10, 10 are attached respectively to upper supporting arms 14 and lower supporting arms 14ª, shown in elevation in Fig. 3 and in plan in Fig. 4. The lower supporting arms 14ª are permanently attached to the table 26, which is solidly constructed of metal. The upper supporting arms 14 are keyed to a shaft 27 rotatable in journals 28, 28 secured to the rear edge of the table 26. The shaft 27 is caused to rotate by the action of a lever arm 29 keyed thereto. The free end of the lever arm 29 is pivoted to the plunger 30 of a ram 31, which is in turn pivoted to the framework 32 of the table 26.

In the operation of the apparatus, the upper half of the apparatus is caused by the action of the ram 31 to assume the position indicated in Fig. 3 in broken lines. A mandrel 12 with a freshly deposited latex rubber tube 11 thereon is placed in the stationary lower half of the apparatus, whereupon the upper half, by a downward movement of the plunger 30 of the ram 31 is brought into juxtaposition therewith, under sufficient pressure to cause the gaskets 13, 13 to seal the longitudinal joints. The ends of the rubber tube are then cuffed back over the ends of the apparatus in the manner shown at 33, 33 in Fig. 1, in order to prevent leakage of air into the interior of the apparatus. Thereupon the valve 34 is manipulated to bring the apparatus into communication with the vacuum line 35. The air is exhausted uniformly in all the communicating chambers of the apparatus, including the space between the inner supporting shell 16 and the rubber deposit 11. The suction acting upon the rubber deposit 11 gently lifts it away from the mandrel 12 against the perforated inner shell 16, where it is firmly supported until the vacuum is released. The multiplicity of small openings 25 in the inner shell 16 eliminates the possibility of air being entrapped between the supporting shell and the tube, with no means of egress, while permitting the uniform and rapid distension of the rubber. At the same time the difference between the atmospheric pressure inside the tube and the vacuum applied through the perforated shell to the outside, compacts the wet rubber and expresses a large part of the water therefrom. When the tube 11 is fully distended against the shell 16 the mandrel 12 is withdrawn at one end of the apparatus, the vacuum is released and low pressure compressed air admitted into the apparatus by means of the valve 34. The tube is thereby released from the apparatus and may be removed by reopening the two halves by means of the ram 31. The rubber is found to be entirely uninjured by the slight and uniform distension which it has undergone.

Since this apparatus is susceptible of numerous modifications without departing from the spirit and scope of the invention, it is not intended to limit the invention except as may be required by the prior art and as indicated in the appended claims.

We claim:

1. The herein described method which comprises building up on a form a layer of wet latex rubber from an aqueous dispersion of rubber, transferring the wet latex rubber layer from the building form to a pervious form, and subjecting the wet latex rubber layer to fluid pressure to compact it and to express liquids therefrom.

2. The method which comprises sucking a wet latex rubber deposit on a form away from the form onto a foraminous supporting surface, and expressing a portion of the water content of the deposit by fluid pressure pressing the deposit against the foraminous supporting surface.

3. The method which comprises forming a deposit of rubber on a form, from an aqueous rubber dispersion, sucking the wet deposit away from the form onto a foraminous supporting surface, and expressing a portion of the water content of the deposit by pressure exerted against one side of the deposit by the foraminous supporting surface and against the other side of the deposit by the atmosphere.

4. The method which comprises forming a rubber deposit by electrodeposition on a form, sucking the wet deposit away from the form onto a foraminous supporting surface, withdrawing the form, and expressing a portion of the water content of the deposit by gas pressure pressing the deposit against the foraminous supporting surface.

In witness whereof we have hereunto set our hands this 7th day of December, 1928.

GEORGE F. WILSON.
WILLIAM H. SLABAUGH.